United States Patent [19]

Copple

[11] 4,436,888

[45] Mar. 13, 1984

[54] METHOD FOR MAKING BALANCED LOW SHRINK TENSION POLYOLEFIN FILM

[75] Inventor: Kerry J. Copple, Webster, Tex.

[73] Assignee: E. I. Du Pont de Nemours and Company, Wilmington, Del.

[21] Appl. No.: 432,836

[22] Filed: Oct. 5, 1982

[51] Int. Cl.³ .................. C08F 110/02; B29C 17/02
[52] U.S. Cl. .................. 526/348.1; 264/210.7; 264/289.6; 264/342 RE
[58] Field of Search .......... 264/289.6, 342 RE, 210.7; 428/910; 526/348.1

[56] References Cited

U.S. PATENT DOCUMENTS

| | | |
|---|---|---|
| 2,412,187 | 12/1946 | Wiley et al. . |
| 2,582,165 | 1/1952 | Rosenfeld . |
| 3,076,232 | 2/1963 | Dengler . |
| 3,141,912 | 7/1964 | Goldman et al. . |
| 3,177,277 | 4/1965 | Adams et al. . |
| 3,231,642 | 1/1966 | Goldman et al. ............ 264/25 |
| 3,231,643 | 1/1966 | Goldman et al. ............ 264/25 |
| 3,231,652 | 1/1966 | Goldman et al. . |
| 3,231,653 | 1/1966 | Goldman . |
| 3,361,861 | 1/1968 | Bertinotti et al. . |
| 3,383,445 | 5/1968 | Gebler et al. . |
| 3,465,072 | 9/1969 | Gregorian . |
| 3,723,583 | 3/1973 | Houermale et al. ............ 264/40 |
| 3,891,737 | 6/1975 | Marsh et al. . |
| 4,277,594 | 7/1981 | Matthews et al. ............ 526/352 |
| 4,335,069 | 6/1982 | Levy ............ 264/290.2 |

FOREIGN PATENT DOCUMENTS

| | | |
|---|---|---|
| 54-62275 | 5/1979 | Japan . |
| 55-103931 | 8/1980 | Japan . |
| 56-15325 | 2/1981 | Japan . |
| 1583560 | 1/1981 | United Kingdom . |

*Primary Examiner*—James B. Lowe

[57] ABSTRACT

Biaxially oriented, balanced, low shrink tension, heat-shrinkable polyolefin film having a shrink percent of at least 7% in both MD and TD at 110° C. and a shrink force of not greater than 2.2 MPa in both MD and TD at 110° C. is produced by a sequential hot/cold/hot/cold treatment of ordinary biaxially oriented, balanced, heat-shrinkable polyolefin film where the film is stretched and relaxed, respectively in the two hot stages of the treatment sequence.

7 Claims, 3 Drawing Figures

METHOD FOR MAKING BALANCED LOW SHRINK TENSION POLYOLEFIN FILM

BACKGROUND OF THE INVENTION

Technical Field

This invention relates to a method for making a polyolefin shrink film having a reasonably balanced lower shrink tension in the machine direction (i.e. MD) and the transverse direction (i.e. TD). More specifically, this invention relates to a method for treating a biaxially oriented heat-shrinkable polyolefin film to partially relax the film, thereby significantly reducing the shrink tension in both the MD and TD, to produce a balanced lower shrink tension film, while maintaining a relatively high shrink percent.

Background Art

U.S. Pat. No. 3,891,737, granted June 24, 1975 to Marsh and Sargent, discloses a method for making a preferentially oriented heat shrinkable film of polyethylene or polyethylene containing copolymers, which method is based upon narrowly restricting the stretch ratio (the relative speeds of the stretch roll and the anneal roll) between 1.2:1 and 1.3:1. In addition, Marsh and Sargent use a series of four rolls, the first three hot and the fourth at room temperature.

U.S. Pat. No. 4,277,594, granted July 7, 1981 to Matthews et al, discloses a method for making a mildly biaxially oriented, blown polyethylene film by successively drawing and relaxing an ordinary biaxially oriented, blown polyethylene film in the longitudinal direction using a series of hot rolls turning at the appropriate speeds to achieve the desired degree of draw and relaxation, respectively. The Matthews process also requires passing the film through a transverse stretcher in between the longitudinal drawing and relaxing.

U.S. Pat. No. 3,141,912, granted July 21, 1964, to Goldman et al, discloses a process for preparing a biaxially oriented heat-shrinkable polyolefin film by extrusion of a tube of film, quenching the tubular film, maintaining a pressure within the tube, heating the film to the orientation temperature range, expanding the diameter of the tube at least 2X and advancing the tubular film in the longitudinal direction by at least 2X. This process can be used to prepare film which was actually used in each of the examples in this application.

SUMMARY OF THE INVENTION

The present invention relates to a method for making a balanced biaxially oriented heat-shrinkable polyolefin film having a relatively low shrink tension in both the MD and TD, while maintaining a relatively high shrink percent in both the MD and TD. While Marsh and Sargent disclose a sequential stretch and shrinkback of a heated polyolefin film, the product resulting from their process is preferentially oriented. In addition, their process is particularly adapted to tubular blown film. The present invention, on the other hand, utilizes a sequential stretch and relax of a heated biaxially oriented polyolefin flat film with a quench or cooling stage in between the stretch and relax stages, as well as a quench or cooling stage following the relax stage. In addition, critical stretch stage temperatures are utilized, as well as critical stretch and relax ratios necessary to produce a film that is balanced, that exhibits relatively low shrink tension, and that exhibits relatively high shrink percent. In addition, the method of the present invention does not adversely effect the other physical and optical properties of the starting material biaxially oriented polyolefin heat shrinkable film.

While Matthews et al produces a mildly biaxially oriented heat-shrinkable film, they require the use of a transverse stretching device to achieve a reasonable balance between the MD and TD shrink properties.

This is achieved in the method of the present invention by sequentially heating the biaxially oriented heat-shrinkable polyolefin film to a temperature of 124°–138° C., preferably 130°–135° C., stretching the hot film in the longitudinal or machine direction (MD) by a factor of 1.05 to 1.2X (i.e. to a length of 1.05 to 1.2 times its original length), preferably 1.08–1.12X, and most preferably about 1.10X, cooling the film to a temperature of not more than 55° C., preferably not more than 40° C., and most preferably not more than 25° C., while maintaining the degree of stretch resulting from the previous step, heating the film to a temperature of 124°–138° C., preferably 130°–135° C., relaxing the hot film in the MD by a factor of 0.83–0.95X (i.e. to a length 0.83 to 0.95 times the length of the stretched film), preferably 0.89–0.93X, and most preferably about 0.91X, and further preferably to a degree that will approximately restore the original MD dimension of the starting biaxially oriented heat-shrinkable polyolefin film, followed by cooling the film to a temperature of not more than 55° C., preferably not more than 40° C., and most preferably not more than 25° C., while maintaining the degree of relaxation resulting from the previous step. In short, the present invention involves a hot/cold/hot/cold (i.e. H/C/H/C) sequence where the film is stretched and relaxed a predetermined quantity in the two hot stages of the sequence, respectively. Reasonably balanced, biaxially oriented, heat-shrinkable polyolefin flat film suitable for use as the starting material in the present invention includes polyolefin films where the polyolefin is polypropylene, polyethylene, copolymers of a major proportion of ethylene and a minor proportion of a normal aliphatic mono-alpha-olefinic hydrocarbon containing 4–8 carbons (e.g. materials commercially available as linear low density polyethylene or LLDPE), copolymers of a major proportion of propylene and a minor proportion of copolymerizable olefins selected from the group consisting of ethylene and iso-butylene, and blends of these polyolefins. Preferably the polyolefin is a propylene/ethylene copolymer containing at least 97 weight percent propylene. The method of the present invention will produce a balanced, biaxially oriented, low shrink tension, heat-shrinkable film having a maximum shrink tension of about 2.2 MPa (about 320 p.s.i.), preferably about 1.7 MPa (250 p.s.i.), and most preferably about 1.6 MPa (230 p.s.i.) and a minimum shrink percent of 7%, preferably 10%, in both the MD and TD, measured at 110° C.

BRIEF DESCRIPTION OF THE DRAWINGS

The accompanying drawings show a schematic representation of equipment which can be used to perform the method of the present invention. In both FIGS. 1 and 2, there is shown schematically an apparatus consisting of a series of idler rolls, nip rolls and process rolls, which process rolls are capable of being operated at various temperatures and relative speeds. As can be seen from FIGS. 1 and 2 a variety of film paths are possible.

DESCRIPTION OF THE PREFERRED EMBODIMENTS

The following Examples illustrate the method of the present invention and the product produced thereby. All measurements made in other than S.I. units have been converted to S.I. units and rounded as appropriate. In each of the Examples 1-7, the starting film was a biaxially oriented, 0.015 mm (0.6 mil) thick, polyolefin shrink film, wherein the polyolefin is a propylene/ethylene copolymer containing 2.5 weight percent ethylene. In Example 8, the starting material was the same except it was 0.019 mm (0.75 mil) thick.

Figure 1:
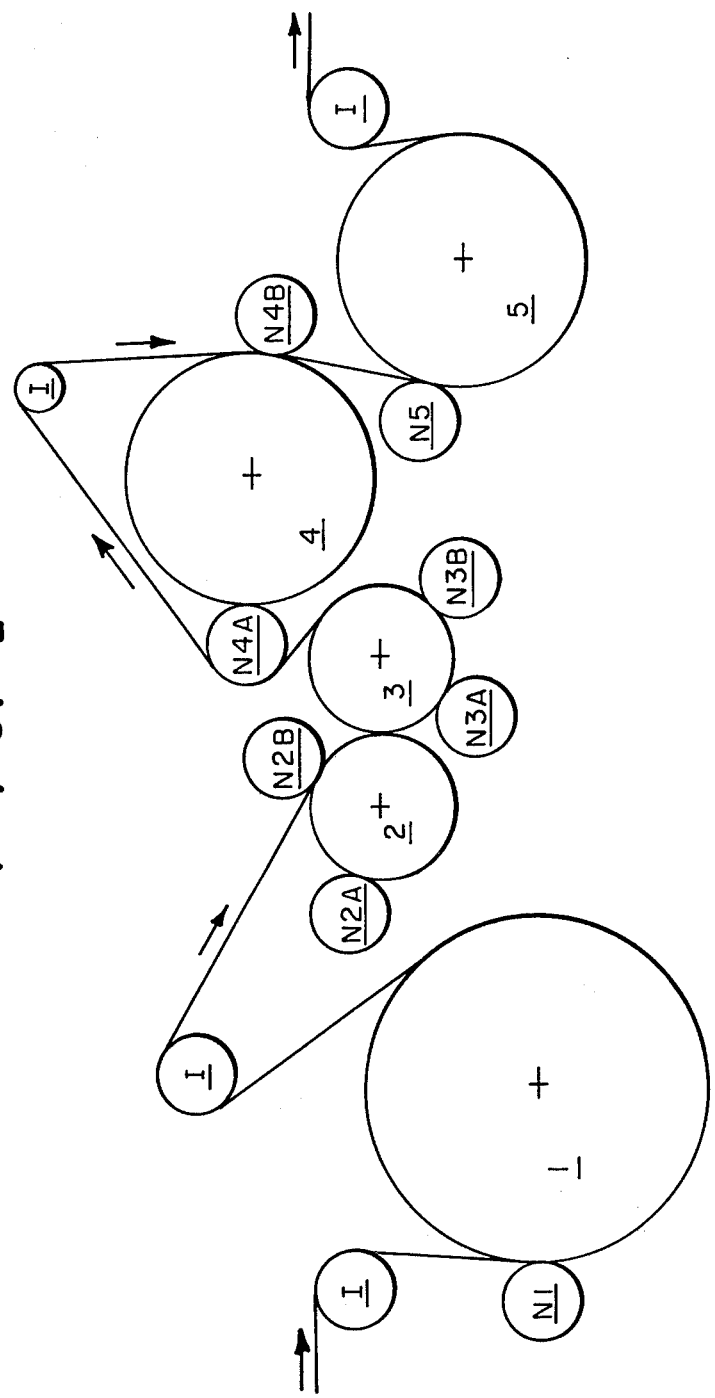
FIG. 1 represents the film path used in Examples 2, 3 and 5
Figure 2:
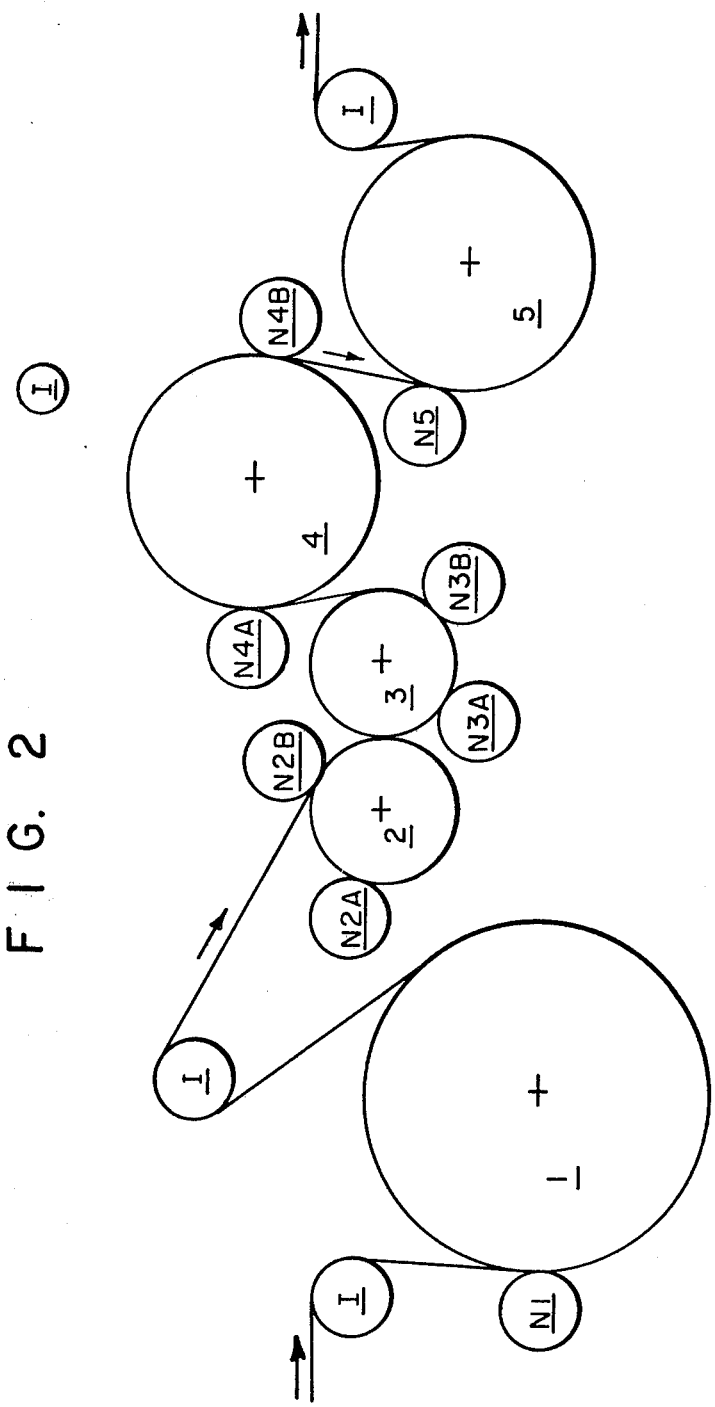
FIG. 2 represents the film path used in Examples 1 and 4, below, in the present application.

The apparatus used in Examples 1-6 was as shown schematically in FIGS. 1 and 2 and comprised the following:

(a) process roll number 1: 18 inches (45.72 cm) in diameter,
(b) process roll number 2: 8 inches (20.32 cm) in diameter,
(c) process roll number 3: 8 inches (20.32 cm) in diameter,
(d) process roll number 4: 14 inches (35.56 cm) in diameter,
(e) process roll number 5: 14 inches (35.56 cm) in diameter,
(f) nip rolls N1, N2A, N2B, N3A, N3B, N4A, N4B and N5, and
(g) idler rolls I.

All of the rolls have a 50 inch (127 cm) roll face. The active rolls in the H/C/H/C sequence were process rolls 2-5, with rolls 2 and 4 being the hot rolls and rolls 3 and 5 being the cold or quench rolls. The stretch of the hot film in the MD was achieved by rotating process roll 3 at a rate greater than process roll 2. The ratio of the linear speed of rotation at the surface of process roll 3 to the linear speed of rotation at the surface of process roll 2 (which was always greater than 1.0) gave the stretch ratio of the film. Process roll 4 was operated at the same linear speed of rotation at the surface as roll 3, thus insuring that the stretch introduced into the hot film in between process rolls 2 and 3 was maintained through the (quench) process roll 3 and to (hot) process roll 4. The relaxation of the film was achieved by rotating process roll 5 more slowly than process roll 4. The ratio of the linear speed of rotation at the surface of process roll 5 to the linear speed of rotation at the surface of process roll 4 (which was always less than 1.0) gave the relaxation ratio of the film. It should be noted that the gap between rolls 2 and 3 and the gap between rolls 4 and 5 should be kept to the minimum possible under mechanical considerations to prevent edge heavying. The temperature of each of the process rolls (T1, T2, T3, T4 and T5 in degrees C.) and the stretch and relaxation ratios were as shown in Table I, below. Similarly the initial film speed in feet/second (and meters/second), i.e. the linear speed of rotation at the surface of process roll 2, and the film path as shown in either FIG. 1 or FIG. 2 was also as shown in Table I below. Process roll 1 was used as a lead-in roll, but this roll is considered optional in the method of the present invention.

TABLE I

| Example No. | 1 | 2 | 3 | 4 | 5 |
|---|---|---|---|---|---|
| Film speed | 200(1.02) | 300(1.52) | 300(1.52) | 300(1.52) | 300(1.52) |
| Stretch ratio | 1.085 | 1.100 | 1.050 | 1.10 | 1.10 |
| Relaxation ratio | 0.916 | 0.916 | 0.950 | 0.90 | 0.90 |
| T1 | 47 | 51 | 51 | 50 | 51 |
| T2 | 137 | 134 | 134 | 135 | 124 |
| T3 | 39 | 42 | 37 | 39 | 45.5 |
| T4 | 136 | 125 | 135 | 135 | 125 |
| T5 | 32 | 41 | 34 | 50.5 | 42 |
| Film path (FIG.) | 2 | 1 | 1 | 2 | 1 |

It should be noted that there was a 1.5% draw between process rolls 1 and 2 to maintain sheet flatness. Each sample was tested for shrink tension (according to the procedure described in ASTM D-2838) and shrink percent (according to the formula $$\frac{L_o - L}{L_o} \times 100$$

where $L_o$ is the original length of a 25.4 mm wide sample, and L is the final length of the sample after immersing it in a hot oil bath for 10 seconds) in both the machine direction and the transverse direction at 110° C. The testing of each sample was replicated at least five times. Average values for each Example are shown in Table II, below, where shrink tension is reported machine direction/transverse direction in p.s.i. (MPa), and shrink percent is reported machine direction/transverse direction:

TABLE II

| Example No. | 1 | 2 | 3 | Control | 4 | 5 |
|---|---|---|---|---|---|---|
| Shrink tension | 250/180 (1.7/1.3) | 310/220 (2.1/1.5) | 290/280 (2.0/1.9) | 420/560 (2.9/3.9) | 210/190 (1.4/1.3) | 310/240 (2.1/1.6) |
| Shrink percent | 11/10 | 14/12 | 13/15 | 21/26 | 10/9 | 13/12 |

Figure 3:
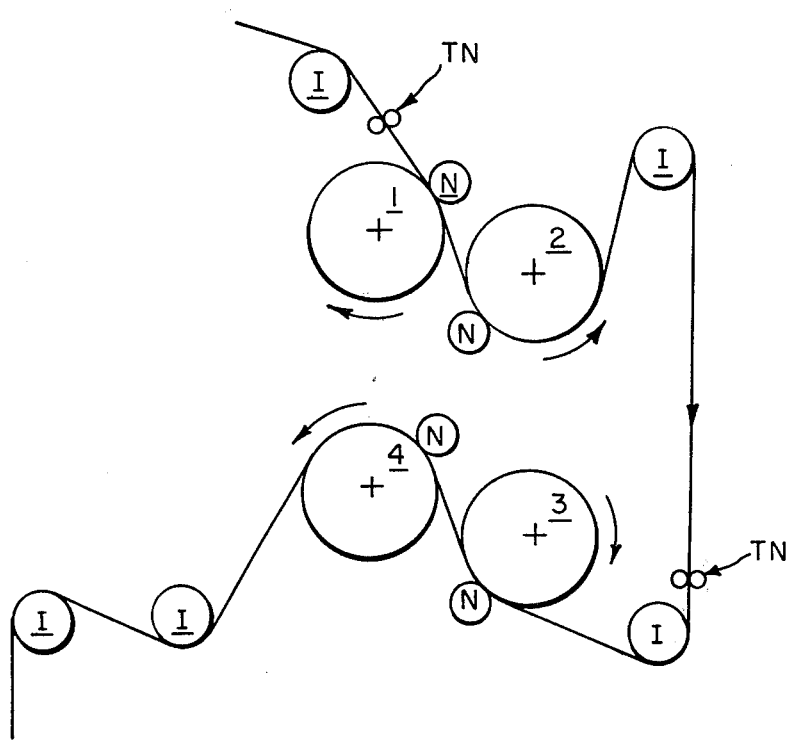
In FIG. 3, there is shown schematically a different apparatus, but one which also consists of a series of idler rolls, nip rolls, process rolls and tentering nips. As with the apparatus shown in FIGS. 1 and 2, the temperature and relative speeds of the process rolls can be varied to fit the needs of the particular desired operating parameters.

The apparatus used in Examples 6-8 was as shown schematically in FIG. 3 and comprised the following:

(a) process rolls number 1 through 4: each 12 inches (30.48 cm) in diameter,
(b) nip rolls N,
(c) idler rolls I, and
(d) tentering nips, TN.

All of the rolls have a 120 inch (305 cm) roll face. Process rolls 1 and 3 were the hot rolls and process rolls 2 and 4 were the cold, or quench rolls. The ratio of the linear speed of rotation at the surface of process roll 2 to the linear speed of rotation at the surface of process roll 1 gave the stretch ratio of the film. Process roll 3 was operated at the same speed as process roll 2. The ratio of the linear speed at the surface of process roll 4 to the linear speed at the surface of process roll 3 gave the relaxation ratio of the film. As in Examples 1-5, the gap between rolls 1 and 2 and between rolls 3 and 4 should be as small as possible to prevent edge heavying. In addition, tentering nips were used as close as possible prior to each of process rolls 1 and 3 to maintain sheet flatness. The temperature of each of the process rolls (T1, T2, T3 and T4 in degrees C.) and the stretch and relaxation ratios were as shown in Table III, below. Similarly, the initial film speed in feet/second (and meters/second) was also as shown in Table III. Shrink tension and shrink percent were tested as described above in Examples 1–5 except that in Example 8, the testing of the sample was replicated three times. Average values are reported in Table III, below:

TABLE III

| Example No. | 6 | 7 | 8 |
| --- | --- | --- | --- |
| Film speed | 300(1.52) | 300(1.52) | 300(1.52) |
| Stretch ratio | 1.10 | 1.20 | 1.10 |
| Relaxation ratio | 0.91 | 0.83 | 0.91 |
| T1 | 128 | 128 | 135 |
| T2 | <25 | <25 | <25 |
| T3 | 136 | 136 | 135 |
| T4 | <25 | <25 | <25 |
| Shrink tension | 250/230 | 300/150 | 220/236 |
|  | (1.8/1.6) | (1.4/1.1) | (1.5/1.6) |
| Shrink percent | 13/12 | 12/10 | 11/10 |

Industrial Applicability

Films made by the method of the present invention have particular utility in wrapping items of relatively low strength or dimensional stability, where low shrink tension is particularly important. Examples of such items include posters, calendars, window boxes, video discs, LP records, and other flexible items.

Best Mode

Although the best mode of the present invention, i.e. the method for making the best low shrink tension, heat-shrinkable polyolefin film, will depend upon the particular desired end use and the specific requisite combination of properties for that use, the single most preferred embodiment of the present invention is the method described in detail in Example 8.

What is claimed is:

1. A method for making a biaxially oriented polyolefin film with substantially balanced shrinkage of at least 7 percent at 110° C. and a substantially balanced shrink force of not more than 2.2 MPa as measured at 110° C., said method comprising the sequential steps of:
    (a) heating a biaxially oriented polyolefin heat-shrinkable film to a temperature of from 124°–138° C.,
    (b) stretching the heated film resulting from step (a) in the longitudinal direction by a factor from 1.05 to 1.20,
    (c) cooling the stretched film resulting from step (b) to a temperature of not greater than 55° C. while maintaining the degree of stretch created in step (b),
    (d) heating the cooled film resulting from step (c) to a temperature of from 124°–138° C.,
    (e) relaxing the heated film resulting from step (d) in the longitudinal direction by a factor of from 0.83 to 0.95, and
    (f) cooling the relaxed film resulting from step (e) to a temperature of not greater than 55° C. while maintaining the degree of relaxation created in step (e).

2. The method of claim 1 wherein the heating temperature in steps (a) and (d) is from 130°–135° C.

3. The method of claim 1 wherein the polyolefin is selected from the group consisting of polyethylene, polypropylene, copolymers of a major proportion of ethylene and a minor proportion of a normal aliphatic mono- alpha-olefinic hydrocarbon containing 4–8 carbons, copolymers of a major proportion of propylene and a minor proportion of a copolymerizable olefin selected from the group consisting of ethylene and isobutylene.

4. The method of claim 3 wherein the polyolefin is a propylene/ethylene copolymer containing at least 97 weight percent propylene.

5. The method of claim 1 wherein the cooling temperature in steps (c) and (f) is not greater than 40° C.

6. The method of claim 1 wherein the heating, stretching, cooling and relaxing steps are carried out on a series of at least four temperature controlled process rolls such that the first of said process rolls is maintained at a temperture of 124°–138° C., the second of said process rolls is maintained at a temperature of not more than 55° C. and is rotated at a linear surface speed of 1.05–1.20 times the linear surface speed of the first roll, the third of said process rolls is maintained at a temperature of 124°–138° C. and is rotated at a linear surface speed approximately equal to the speed of the second roll, and the fourth process roll is maintained at a temperature of not more than 55° C. and is rotated at a linear surface speed of 0.83–0.95 times the speed of the third roll.

7. The product produced by the process of claim 1.

* * * * *